(12) United States Patent
Koyanagi

(10) Patent No.: US 9,757,988 B2
(45) Date of Patent: Sep. 12, 2017

(54) PNEUMATIC TIRE

(75) Inventor: Jun Koyanagi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 468 days.

(21) Appl. No.: 14/124,134

(22) PCT Filed: Jul. 13, 2012

(86) PCT No.: PCT/JP2012/004551
§ 371 (c)(1),
(2), (4) Date: Dec. 5, 2013

(87) PCT Pub. No.: WO2013/011681
PCT Pub. Date: Jan. 24, 2013

(65) Prior Publication Data
US 2014/0124109 A1    May 8, 2014

(30) Foreign Application Priority Data

Jul. 15, 2011    (JP) .................................. 2011-156994

(51) Int. Cl.
*B60C 11/03*    (2006.01)
*B60C 11/04*    (2006.01)

(52) U.S. Cl.
CPC .......... *B60C 11/03* (2013.01); *B60C 11/0302* (2013.04); *B60C 11/0304* (2013.04); *B60C 11/0306* (2013.04); *B60C 11/0311* (2013.04); *B60C 11/04* (2013.01); *B60C 2011/0313* (2013.04); *B60C 2011/0374* (2013.04);
(Continued)

(58) Field of Classification Search
CPC ............ B60C 11/0302; B60C 11/0311; B60C 11/0316; B60C 2011/0313; B60C 2011/0381; B60C 2200/065
See application file for complete search history.

(56) References Cited

U.S. PATENT DOCUMENTS 3,457,981 A * 7/1969 Verdier ................... B60C 11/00
152/209.13
3,880,218 A * 4/1975 Brajenovich ....... B60C 11/0311
152/209.22
4,178,199 A * 12/1979 Lippman ............. B60C 11/0311
152/209.13

FOREIGN PATENT DOCUMENTS

DE         2263455    *  7/1974
EP    1 884 377 A1    2/2008
(Continued)

OTHER PUBLICATIONS

English machine translation of JP05-286307, dated Nov. 1993.*
(Continued)

*Primary Examiner* — Robert Dye
(74) *Attorney, Agent, or Firm* — Oliff PLC

(57) ABSTRACT

A pneumatic tire having a specified rotational direction and including land portions formed compartmentally on the tread of the pneumatic tire by disposing plural inclined grooves extending from both tread ends respectively toward the tire equator and inclined toward the rotational direction with respect to a tire width direction, and also including branch grooves on the tread, each of the branch grooves diverging from a portion of the inclined groove within an area till ¼ of the tread width from the tread, extending to the tire equator in the opposite tire circumferential direction of the inclined groove with respect to the tire width direction and terminating within the land portions.

10 Claims, 2 Drawing Sheets

(52) U.S. Cl.
CPC ............... *B60C 2011/0381* (2013.04); *B60C 2011/0388* (2013.04); *B60C 2200/065* (2013.04)

(56) References Cited

FOREIGN PATENT DOCUMENTS

| JP | 03-135802 | * | 6/1991 |
|---|---|---|---|
| JP | H05-286306 A | | 11/1993 |
| JP | H05-286307 A | | 11/1993 |
| JP | 09-039516 | * | 2/1997 |
| JP | H11-291716 A | | 10/1999 |
| JP | A-2001-39124 | | 2/2001 |
| JP | A-2006-273258 | | 10/2006 |
| JP | A-2006-327454 | | 12/2006 |
| JP | A-2011-46260 | | 3/2011 |

| WO | WO 2006/013758 A1 | 2/2006 |
|---|---|---|

OTHER PUBLICATIONS

English machine translation of DE2263455, dated Jul. 1974.*
English machine translation of JP09-039516, dated Feb. 1997.*
International Search Report issued in International Patent Application No. PCT/JP2012/004551 mailed Sep. 11, 2012.
Dec. 9, 2014 Office Action issued in JP Application No. 2013-524610.
Feb. 13, 2015 Extended European Search Report issued in European Application No. 12814703.0.
Mar. 7, 2015 Office Action issued in Australian Application No. 2012285264.
Jul. 1, 2015 Chinese Office Action issued in Chinese Patent Application No. 201280033884.X.

* cited by examiner

PNEUMATIC TIRE

TECHNICAL FIELD

The present invention intends to prolong a service life of a pneumatic tire, and in particular, a pneumatic tire for construction vehicles used in construction sites, mines and the like, by optimizing a tread pattern thereof so as to improve partial wear resistance without deteriorating in heat release property.

BACKGROUND ART

Concerning a tire for large construction vehicles used in mines and the like, there has been a problem that early progress of wear, particularly in side portions of around ⅛ to around ¼ of a tread width from tread ends, causes partial wear. This kind of tires is usually provided with a crossing belt at a crown portion of a carcass to an outer side in the tire radial direction, and the crossing belt is formed by laminating at least two of inclined belt layers, which are made of a plurality of cords being extendingly inclined with respect to the tire equatorial plane, in a direction where the cords are crossing within the inclined belt layers. When the tire has this sort of a crossing belt and rotates with load, the crossing belt deforms in a tread ground contact area accompanied by so-called pantograph movement, in which crossing angles of the cords vary between the laminated layers. As the crossing belt deforms, rubber deformation will occur in the ground contact portion during a series of behavior of the tread ground contact surface from stepping into to kicking out the road surface. This rubber deformation is prominent, in particular in the above stated side portions so that a rubber slipping quantity increases when kicking out. As a result, wear is early progressing on these side portions.

In order to improve wear resistance of tires, a countermeasure has conventionally been taken that a tread rubber gauge is thickened to prolong a service life against wear. However, this countermeasure is considered to increase a volume of the tread rubber, which may worsen heat release property when driving and cause troubles such as heat separation and the like.

In addition, Patent Document 1 discloses a technique for suppressing tread rubber deformation in the tire width direction and thus wear in portions extending from tread ends to ¼ of a tread width and peripheral portions thereof (so-called ¼ point portions) as a preventive means for the partial wear, by disposing tire-circumferential narrow grooves from the tire equator beyond the ¼ points of the tread width towards outer sides in the tire width direction, in addition to a plurality of lug grooves disposed at an interval in the tire circumferential direction and extending in the tire width direction.

PRIOR ART DOCUMENT

Patent Literature

PTL 1: WO2006/013758A1

SUMMARY OF THE INVENTION

Problem to be Solved by the Invention

However, the pneumatic tire disclosed by PTL1 has improved in slipping caused by the tread rubber deformation in the tire width direction, it has not yet been taken into consideration to decrease another slipping in the tire circumferential direction. Therefore, sufficient partial wear resistance has not yet been secured in a comprehensive way.

Consequently, an object of the present invention is to provide a pneumatic tire which improves in partial wear resistance by optimizing a tread pattern so as to reduce the tread portion slipping particularly in the tire ¼ point portions both in the tire width and circumferential directions effectively without deteriorating in heat release property.

Means for Solving the Problem

The present invention has been made to solve the above problem.

That is, according to the present invention, there is provided a pneumatic tire having a specified rotational direction and comprising land portions formed compartmentally on the tread of the pneumatic tire by disposing a plurality of inclined grooves extending from both tread ends respectively toward the tire equator and inclined toward the rotational direction with respect to the tire width direction, and comprising also branch grooves on the tread, each of the branch grooves diverging from a portion of the inclined groove within an area till ¼ of the tread width from the tread end to an inner side in the tire width direction, extending to the tire equator in the opposite tire circumferential direction of the inclined grooves with respect to the tire width direction and terminating within the land portions.

As used herein, the term "rotational direction" of the tire refers to a direction in which a tire mounted on a vehicle is rotating when advancing. Also as used herein, the term "tread ends" refers to the outermost ground contact portions in the tire width direction, in the case of a pneumatic tire which is installed to a standard rim as defined according to the "JATMA YEAR BOOK" (Japan Automobile Tire Manufactures Association), and which is inflated to an internal pressure of 100% of the air pressure (maximum air to pressure) corresponding to the maximum load capability (a load indicated by bold characters in a corresponding table of internal pressure/load capability) in the applied size/ply rating in JATMA YEAR BOOK, and the tire bears the maximum load capability (hereinafter, as "predetermined condition"). It will be noted that when the TRA standard or the ETRTO standard is used in the location of use or the location of manufacture, these respective standards are applied. Furthermore, the term "tread width" as used herein refers to the distance between the tread ends of both sides, as measured in the tire width direction. It is also noted that "branch gloves" are closed when grounding under the predetermined condition.

Due to the inclined grooves that are inclined toward the rotational direction, this pneumatic tire makes it possible to suppress tread rubber behavior in the tire width direction involved in belt deformation and thus to decrease slip phenomena of the rubber portion. Moreover, the branch grooves diverge from the portions of the inclined grooves within the areas till ¼ of the tread width from the tread ends, extend toward the tire equator in the opposite tire circumferential direction of the inclined grooves with respect to the tire width direction and terminate within the land portions so that deformation of the land portions will arise along the inclined grooves at ground contact of the tread. Consequently, the tread rubber deformation in the tire circumferential direction, which is involved in the above stated belt deformation, is reduced. As a result, the slip phenomena is suppressed. Specifically, the tread rubber from the branch grooves to an inner side in the tire width direction is accelerated to move toward an outer side in the tire width direction, thus suppressing the partial wear caused by the rubber behavior in the tire width direction involved in the belt deformation. Also in branch groove ends (kick-out sides of the land portions), tread rubber portions at the both sides across the branch grooves deform respectively in grounding so that tire width directional elements act to compensate with each other in the facing direction. And regarding tire circumferential elements, deforming elements having the same direction arise at the both sides across the branch grooves and the both deforming elements join together at end edges of the branch grooves, which thus leads to compensating the tire circumferential elements caused by the above stated belt deformation. As a result of the aforementioned, the partial wear, in particular on the side portion areas, caused by the above stated belt deformation can be suppressed.

In addition, it is preferable that the shortest distance between a branch groove and an inclined groove neighboring the branch groove in the opposite side of the rotational direction (rear side) is within the range of 15% to 30% of the tread width, which makes it possible to reduce slip phenomena of the tread more surely. In case the shortest distance between a branch groove and an inclined groove neighboring the branch groove in the opposite side of the rotational direction is less than 15% of the tread width, it is impossible to cause sufficient rubber deformation in the tire circumferential direction in the branch groove end, therefore, the partial wear cannot be suppressed. Moreover, in case the shortest distance between a branch groove and an inclined groove neighboring the branch groove in the opposite side of the rotational direction is more than 30% of the tread width, rubber deformation will not arise sufficiently in an inner side of the branch groove in the tire width direction, thus, the partial wear cannot be suppressed. Here, the phrase "the shortest distance between a branch groove and an inclined groove neighboring the branch groove in the opposite side of the rotational direction (rear side)" refers to the shortest distance between boundary lines, one of which is formed between the branch groove and the land portion on the tread by the branch groove and the other of which is formed between the inclined groove and the land portion by the inclined groove neighboring the branch groove in the opposite side of the rotational direction.

It is also preferable to dispose the position in which each branch grooves diverges from an inclined groove within an inside area of 1/16 of the tread width from the tread end in the tire width direction, thereby making it possible to reduce the slip phenomena of the tread more surely.

It is also preferable that an extending direction of the branch grooves is within the angel range of 30° to 60° with respect to the tire width direction, thereby making it possible to strike rubber deformation balance both in the tire width and circumferential directions and thus leading to total reduction of the partial wear.

Furthermore, it is preferable that an inclination angle of the inclined grooves with respect to the tire width direction is within the range of 5° to 45°.

The inclined grooves extend preferably from the tread ends at least beyond 3/10 of the tread width to an inner side area in the tire width direction, and a width of the inclined grooves is preferably within the range of 10% to 30% of the tread width. In addition, a depth of the inclined grooves is preferably within the range of 60% to 90% of a thickness of the tread rubber. Here, the term "thickness of the tread rubber" refers to the distance between the tread in the 1/4 point portion and a tire diameter directional outer surface of the belt layer positioned in the outermost side in the tire diameter direction.

A distance of each branch groove between an end edge thereof and an end branching into the inclined groove is preferably within the range of 50% to 90% of a distance between one inclined groove end connecting with the tread end and the other end edge thereof. And a width of the branch groove is preferred to be within the range of 0.5% to 4% of the tread width. In addition, a depth of the branch groove is preferably 1/3 or more of a depth of the inclined groove. Due to the aforementioned, it is possible to strike a rubber deformation balance both in the tire width and circumferential directions, thereby reducing the partial wear totally.

It is noted that a negative ratio of the tread ground contact surface is preferably within the range of 15% to 30%, thereby making it possible to secure heat release resistance of the tread. A negative ratio in excess of 30% decreases stiffness of the land portions and thus wear resistance may deteriorate. And a negative ratio less than 15% makes heat release property worse, becoming a cause of malfunction such as heat separation and the like.

Advantageous Effect of the Invention

According to the present invention, it is possible to provide a pneumatic tire having the partial wear resistance that is effectively improved without deteriorating in the heat release property when the tire rotates with load.

BEST MODE FOR CARRYING OUT THE INVENTION

An embodiment according to the present invention will be described in detail below based on the drawings. In accordance with the custom, a pneumatic tire of the embodiment is provided with a pair of bead portions, a pair of side wall portions extending from the bead portions to an outer side in the tire diameter direction and a tread portion between the side wall portions. In the configuration of the pneumatic tire, there are a carcass toroidally extending between each bead core embedded in the bead portions and a belt composed of a plurality of belt layers at a crown portion of the carcass to an outer side in the tire radial direction.

Figure 1:
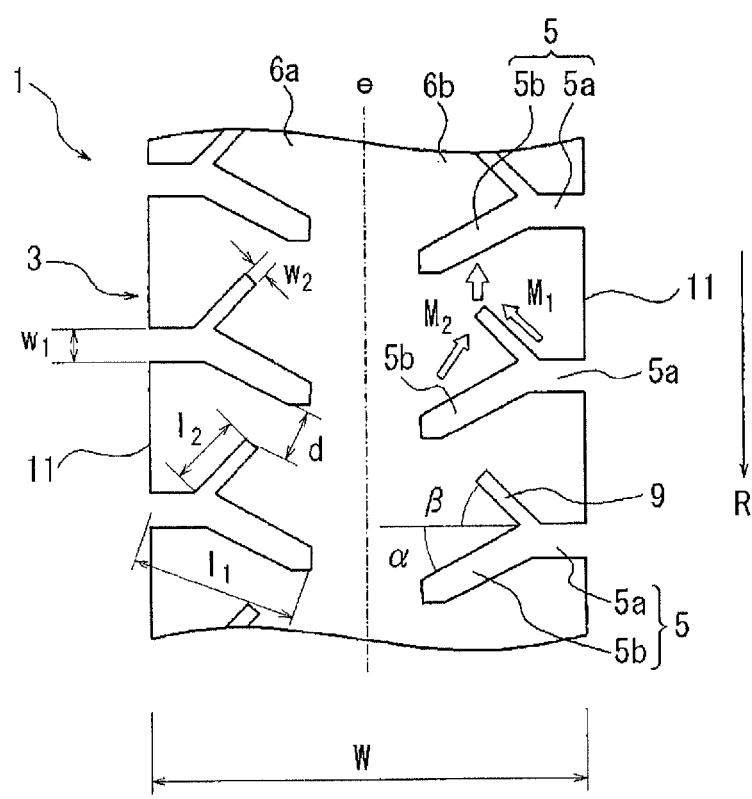
FIG. 1 is an exploded view showing a part of the tread of a pneumatic tire as an embodiment of the present invention.

FIG. 1 is an exploded view showing a part of the tread of a pneumatic tire of an embodiment according to the present invention. A pneumatic tire 1 of the embodiment has a specified rotational direction R and is provided with land portions formed compartmentally on a tread portion 3 by disposing a plurality of inclined grooves 5 that are configured at an interval with each other in the tire circumferential direction and extending from both tread ends 11 toward the tire equator e of the tire 1. Each of the inclined grooves 5 is composed of an extending part 5a in the tire width direction and an inclined part 5b at an angle α with respect to the tire width direction. Each of branch grooves 9 diverges from the inclined groove 5 within an area till ¼ of the tread width from the tread end 11, extends to the tire equator e in the opposite direction of the inclined groove 5 with respect to the tire width direction with an inclination at an angle β with respect to the tire width direction and terminates respectively either within land portions 6a or 6b of each half tread width area defined by the equator e.

Next, a mechanism will be described for suppressing the partial wear by a tread pattern according to the present invention. First of all, the inclined grooves 5 are provided. In particular, the inclined groove part 5b of each inclined groove 5, which is inclined toward the rotational direction R, produces an effect for suppressing tread rubber deformation in the tire width direction involved in the belt deformation. In addition, each inclined groove 5 is provided with the branch groove, which diverges from the inclined groove 5 within the area till ¼ of the tread width from the tread end 11, making it possible to decrease the tire width directional elements of the rubber deformation in the above stated side portion area. In case the branch grooves extend in the tire circumferential direction and cross the land portions (see FIG. 2(d)), the independent land portions are thus formed. As a result, tread rubber deformation in the tire circumferential direction may be promoted. Therefore, it is important to incline the branch grooves 9 toward the tire equator e as shown in FIG. 1. That is, according to such a configuration of the branch grooves 9, the land portions formed compartmentally between the mutual inclined grooves 5 are divided at an angle with respect to the tire circumferential direction by the branch grooves 9. At ground contact of the land portions, as shown by an arrow in FIG. 1, the tread deformation is led to a deformation $M_1$ from a side of the tread end 11 and a deformation $M_2$ from a side of the equator e, and both deformations $M_1$ and $M_2$ are proceeding along the branch groove 9 toward the end edge thereof. The deformation $M_2$ from the side of the equator e suppresses the rubber behavior in the tire width direction involved in the belt deformation. At the end edge of the branch groove 9, both deformations $M_1$ and $M_2$ join together so that tire width directional elements of both sides across the branch groove 9 act to compensate with each other and are dissolved. And remaining tire circumferential elements join together an the end edge of the branch groove 9 and then form the tire circumferential elements in the opposite direction of the rotational direction R.

Figure 2:
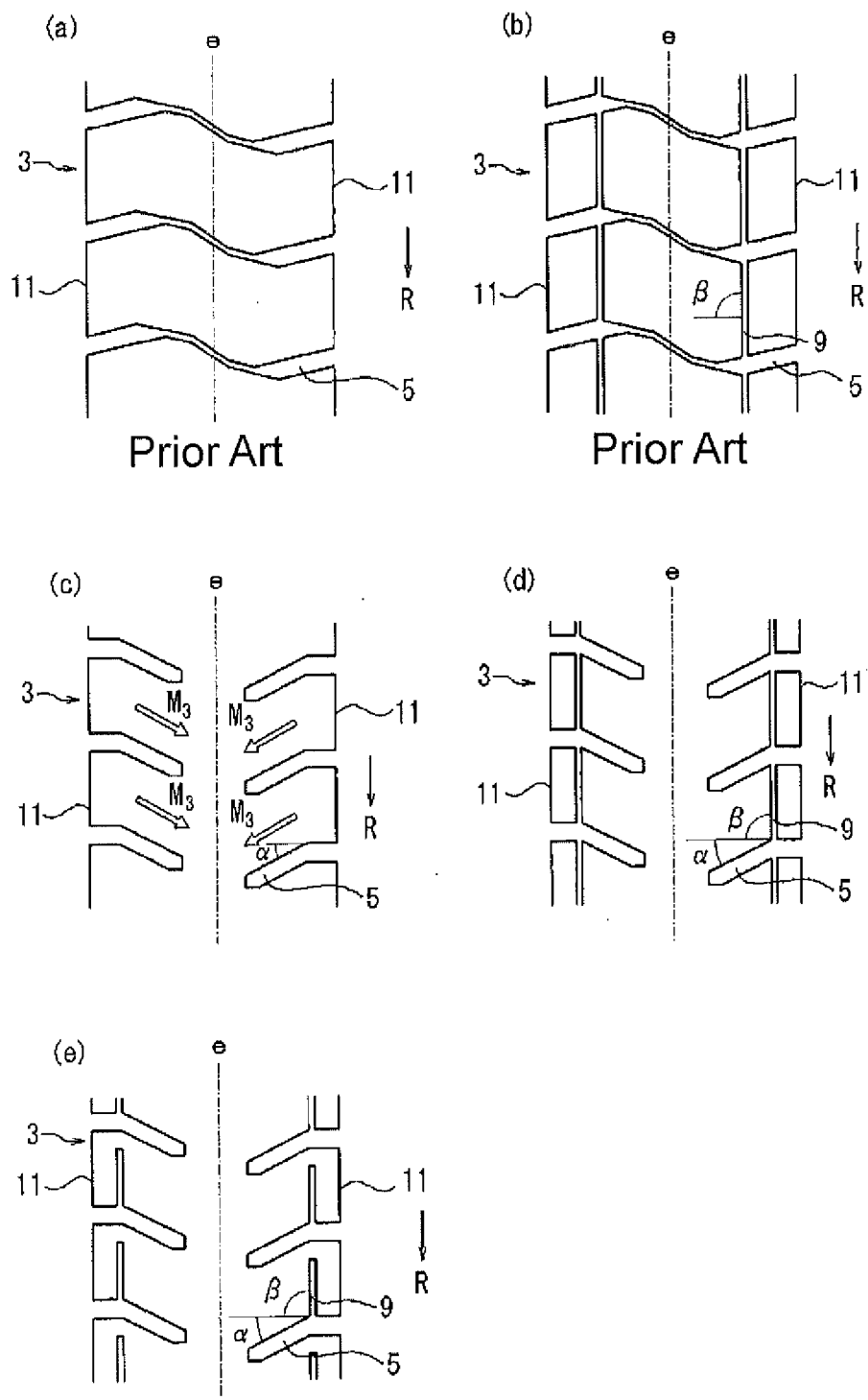
FIGS. 2(a) and 2(b) are exploded views showing a part of the tread of conventional examples 1 and 2 respectively.
FIGS. 2(c), 2(d) and 2(e) are exploded views showing a part of the tread of the comparative examples 1, 2 and 3 respectively.

Here, FIG. 2 (c) shows a part of a tire in which the land portions are formed compartmentally on the tread by the inclined grooves. As shown by an arrow $M_3$, the tread rubber deformation involved in the above stated belt deformation proceeds along the inclined grooves 5 toward the rotational direction R and the tire width directional elements affect each other in the facing direction across the tire equator and act to compensate. As a result, mostly tire circumferential elements remain. These tire circumferential elements have been the principal cause of the partial wear. Now that the above stated tire circumferential elements in the opposite direction of the rotational direction R are formed by the branch grooves 9 and thus the tire circumferential elements act to compensate with each other. Consequently, it is achieved to suppress the partial wear in the tire circumferential direction.

As shown in FIG. 1, it is noted that the shortest distance d between the branch groove 9 and the inclined groove 5 neighboring the branch groove 9 in the opposite side of the rotational direction is preferably within the range of 15% to 30% of the tread width, thereby making it possible to reduce the slip phenomena of the tread more surely. In case the shortest distance between the branch groove 9 and the inclined groove neighboring the branch groove 9 in the opposite side of the rotational direction is less than 15% of the tread width W, it is impossible to cause sufficient rubber deformation in the tire circumferential direction in the branch groove end, therefore, the partial wear cannot be suppressed. Moreover, in case the shortest distance between the branch groove and the inclined groove neighboring the branch groove in the opposite side of the rotational direction is more than 30% of the tread width W, rubber deformation will not arise sufficiently in an inner side of the branch groove in the tire width direction, thus, the partial wear cannot be suppressed.

It is also preferable to dispose the position in which each branch groove 9 diverges from the inclined groove 5 within an inside area of 1/16 of the tread width W from the tread end 11 in the tire width direction, thereby making it possible to reduce the slip phenomena of the tread more surely.

It is also preferable that an inclination angle β of the branch grooves 9 with respect to the tire width direction is within the angel range of 30° to 60°, thereby making it possible to strike the rubber deformation balance both in the tire width and circumferential directions, and thus leading to the total reduction of the partial wear.

Furthermore, it is preferable that an inclination angle α of the inclined grooves 5 with respect to the tire width direction is within the range of 5° to 45°

The inclined grooves 5 extend preferably from the tread ends 11 at least beyond 3/10 of the tread width W to inner side areas in the tire width direction, and an average width $W_1$ of the inclined grooves 5 is preferably within the range of 10% to 30% of the tread width. In addition, a depth of the inclined grooves 5 is preferably within the range of 60% to 90% of a thickness of the tread rubber.

A distance l2 of each branch groove 9 between an end edge thereof and an end branching into the inclined groove 9 is preferably within the range of 50% to 90% of a distance l1 between one end of the inclined groove 5 connecting with the tread end and the other end edge thereof. And an average width w2 of the branch grooves is preferred to be within the range of 0.5% to 4% of the tread width. In addition, a depth of the branch grooves is preferably ⅓ or more of a depth of the inclined grooves.

It is noted that a negative ratio of the tread ground contact surface is preferably within the range of 15% to 30%, thereby making it possible to secure heat release resistance of the tread. A negative ratio in excess of 30% decreases stiffness of the land portions and thus wear resistance may deteriorate. And a negative ratio less than 15% makes heat release property worse, becoming a cause of malfunction such as heat separation and the like.

In addition, an average value of a groove width of the branch grooves 9 is preferably smaller than that of the inclined grooves 5, thereby making it possible to reduce the slip phenomena of the tread more surely.

It is noted that there is a means to dispose a displaying part such as an arrow at a visible position on a tire outer surface as a means for indicating a rotational direction. Any forms or characters indicating a rotational direction may be adopted as this means, and an indication of a mounting position to a vehicle or an inside and outside expression are also acceptable.

As the aforementioned, explanation has been made according to the illustrated examples. However, the present invention is not limited to the above mentioned embodiments but can be modified as necessary within the scope of claims. For example, the inclined grooves 5 in FIG. 1 extend from the tread ends 11 with an approximately fixed groove width and terminate short of the tire equator e. However, the inclined grooves 5 can be shaped in such a manner that the width thereof expands partly or tapers to a point. Moreover the inclined grooves 5 may cross the equator e and extend further. In addition, the inclined grooves 5 may be shaped in such a manner as to extend linearly from the tread ends 11 to the end edge or extend circularly. The point is that the majority of the inclined grooves 5 is disposed according to the above stated inclined configuration. The branch grooves may be also shaped in such a manner as to extend in zigzags or to extend in a curving line.

Example

Next, the pneumatic tire according to the present invention has been produced for performance evaluation and results thereof will be explained hereafter. Each of conventional examples 1 and 2 and each of comparative examples 1, 2 and 3 has a tire size of 46/90R57.

The pneumatic tire of Conventional example 1 is provided with the tread pattern shown in FIG. 2(a), in which the inclined grooves connect the tread ends mutually. And the pneumatic tire of Conventional example 2 has the tread patter shown in FIG. 2(b), in which, in addition to the tread patter of Conventional example 1, the branch grooves extend in the tire circumferential direction and divide the land portions.

The tire of Comparative example 1 is provided with the tread pattern shown in FIG. 2(c). In the tread pattern of Comparative example 2 shown in FIG. 2 (d), the branch grooves in the tire circumferential direction are added to the tread pattern of Comparative example 1. In Comparative example 3 shown in FIG. 2(e), the branch grooves of the tire of Comparative example 2 terminate in the kick-out sides of the land portion blocks.

Each tread pattern of Conventional examples 1 and 2, and each tread pattern of Comparative examples 1, 2 and 3 is provide with the following groove configuration as shown in the below table 1. Here, the term "Inclined groove depth" refers to a depth in a position in which a tread wear indicator is disposed, the term "Inclined groove length" refers to a length of a line connecting centers of a groove width and the term "Inclined groove angle" refers to an angle of the inclined groove with respect to the tire width direction. In addition, the term "Branch groove length" means a length of a line connecting centers of a groove width and the term "Branch groove angle" means an angle of the branch groove with respect to the tire width direction.

(Performance Evaluation Test)

Each test tire as above stated is mounted on a rim (29.0×6.0) under the conditions of tire internal pressure: 700 kPa and load applied: 60,000 kg. After using as a front tire for a construction vehicle at a site of a mine for 1,000 hours, each result was subject to evaluation. The results thereof are shown in Table 1.

The evaluation results of Table 1 show that the example tire of the present invention has improved in wear resistance. Moreover, it is clear that by disposing the branch grooves with an inclination and terminating the branch grooves within the land portions, wear resistance is also enhanced.

INDUSTRIAL APPLICABILITY

Consequently, according to the present invention, it is possible to provide a pneumatic tire which improves in partial wear resistance by suppressing slipping both in the tire width and circumferential directions effectively without deteriorating in heat release property.

DESCRIPTION OF REFERENCE NUMERALS

1 Pneumatic tire
3 Tread portion
5 Inclined groove
9 Branch groove
11 Tread end
R Tire rotational direction
E Tire equator

The invention claimed is:

1. A pneumatic construction vehicle tire having a specified rotational direction, the pneumatic tire comprising:
land portions formed compartmentally on the tread of the pneumatic tire by disposing a plurality of inclined grooves extending from both tread ends respectively toward the tire equator and inclined toward the rotational direction, and
branch grooves also on the tread, each of the branch grooves diverging from a portion of a corresponding inclined groove within an area till ¼ of the tread width from the tread end to an inner side in the tire width direction, extending toward the tire equator in the opposite tire circumferential direction of the inclined groove and terminating within the land portions, wherein
the position in which each branch groove diverges from the inclined groove, is disposed within an inside area of ¹⁄₁₆ of the tread width from the tread end in the tire width direction.

2. A pneumatic tire according to claim 1, wherein the shortest distance between the branch groove and the inclined

TABLE 1

|  | Conventional example 1 | Conventional example 2 | Comparative example 1 | Comparative example 2 | Comparative example 3 | Example of invention |
|---|---|---|---|---|---|---|
| Inclined groove depth (mm) | 97 | 97 | 97 | 97 | 97 | 97 |
| Inclined groove length (mm) | 364 | 364 | 364 | 364 | 364 | 364 |
| Left-right symmetry | No | No | Yes | Yes | Yes | Yes |
| Inclined groove angle (α) | — | — | 30° | 30° | 30° | 30° |
| Branch groove | No | Yes | No | Yes | Yes | Yes |
| Branch groove length (mm) | — | 237 | — | 237 | 158 | 158 |
| Branch groove angle (β) | — | 90° | — | 90° | 90° | 45° |
| Wear resistance (index) | 100 | 105 | 100 | 105 | 110 | 120 | groove neighboring the branch groove in the opposite side of the rotational direction is within the range of 15% to 30% of the tread width.

3. A pneumatic tire according to claim 1, wherein an extending direction of the branch grooves is within the angle range of 30° to 60° with respect to the tire width direction.

4. A pneumatic tire according to claim 2, wherein an extending direction of the branch grooves is within the angle range of 30° to 60° with respect to the tire width direction.

5. A pneumatic tire according to claim 1, wherein an extending direction of the inclined grooves is within the angle range of 5° to 45° with respect to the tire width direction.

6. A pneumatic tire according to claim 1, wherein a distance $I_2$ of each branch groove between an end edge thereof and an end branching into its corresponding inclined groove is within the range of 50% to 90% of a distance $I_1$ between one end of the inclined groove connecting with the tread end and the other end edge thereof.

7. A pneumatic tire according to claim 1, wherein an average width $w_2$ of the branch grooves is within a range of 0.5% to 4% of the tread width.

8. A pneumatic tire according to claim 1, wherein a depth of the branch grooves is ⅓ or more of a depth of the inclined grooves.

9. A pneumatic tire according to claim 1, wherein an average width $w_1$ of the inclined grooves is within a range of 10% to 30% of the tread width.

10. A pneumatic tire according to claim 1, wherein a depth of the inclined grooves is within a range of 60% to 90% of a thickness of the tread rubber.

\* \* \* \* \*